Sept. 21, 1954  J. J. MOJONNIER  2,689,638
CONVEYER
Filed June 14, 1949  2 Sheets-Sheet 1
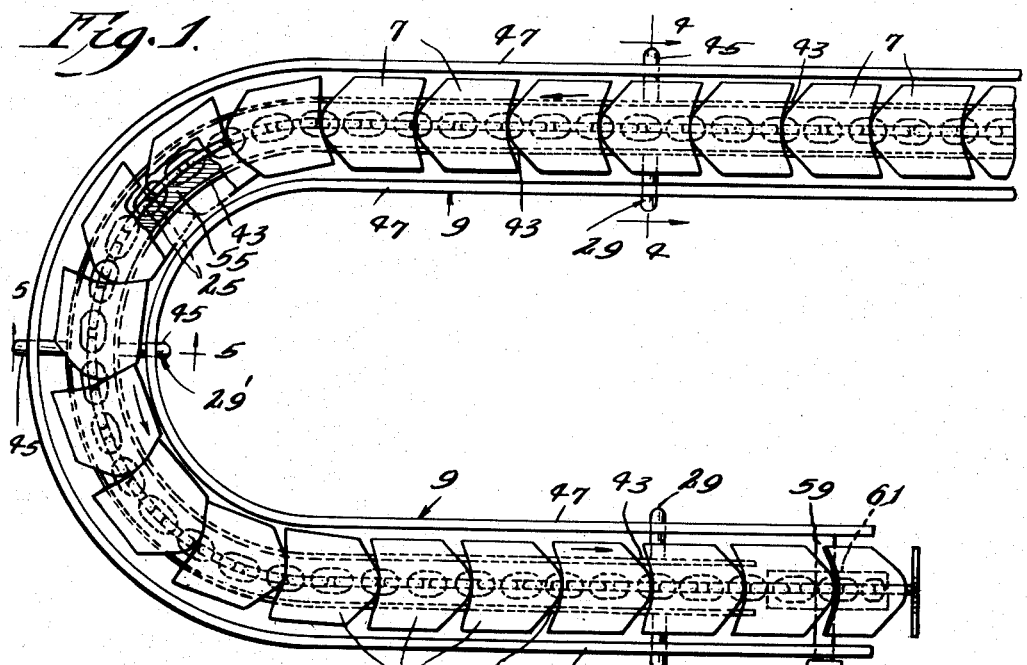
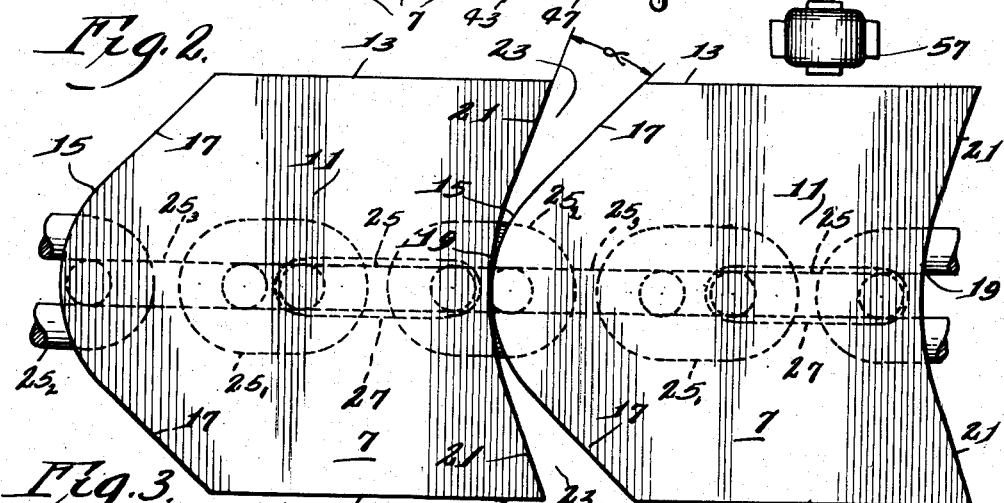
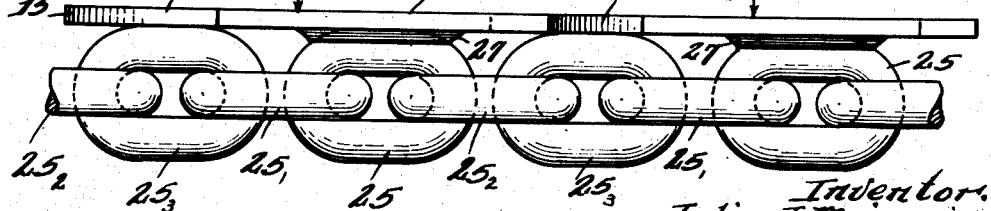
Inventor:
Julius J. Mojonnier
By Soans, Pond & Anderson
Attorneys.

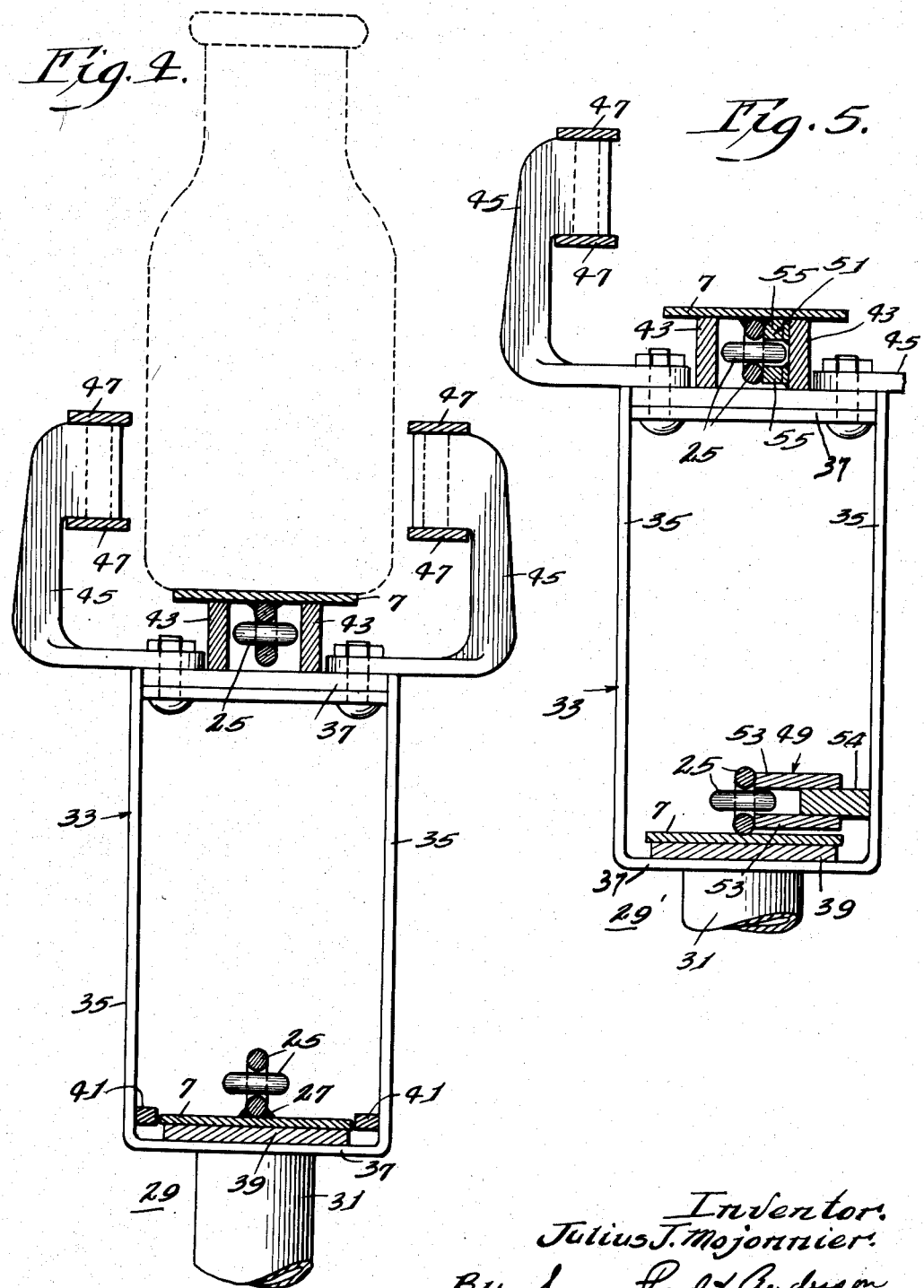

Patented Sept. 21, 1954

2,689,638

UNITED STATES PATENT OFFICE 2,689,638

CONVEYER

Julius J. Mojonnier, Winfield, Ill., assignor to Mojonnier Bros. Co., Chicago, Ill., a corporation of Illinois Application June 14, 1949, Serial No. 98,927

6 Claims. (Cl. 198—189)

This invention relates generally to an improved conveyor, and more particularly to an endless conveyor of the type used for conveying bottles, cans, and other articles.

Various types of endless conveyors are employed in dairies and canneries and other food processing plants for conveying cans and bottles about the plant. The conveyors now in use usually comprise a plurality of flat plates or carriers which are slidably supported in suitable guideways for movement therealong. The plates are interconnected by combinations of swivels and universal joints to enable the conveyor to be trained both around sprockets having horizontally disposed axes of rotation and around sprockets having vertically disposed axes of rotation. While the known conveyors are highly satisfactory from the view point of mechanical service, they are difficult to clean and thus are not entirely satisfactory for use about a dairy or other food processing plant where it is necessary to clean the chain every day or sometimes even oftener.

When long runs of conveyor are employed in moving containers from place to place, the carrier plates often become canted or tilted incident to the chain being trained around a corner. Further, whenever it is desired to move the known conveyors about a corner, it is necessary to provide a sprocket to effect the necessary change in direction. This, in effect, limits the conveyor to rather sharp corners unless a number of the turning sprockets are employed. Desirably, the carrier plates of the conveyor should be maintained in a level position at all times during operation and the conveyor should be capable of being readily disposed around either relatively sharp corners or around sweeping curves, thus making possible the smooth and uninterrupted progress of the articles being conveyed.

Accordingly, the principal object of this invention is the provision of an improved carrier chain of the class described which is capable to being driven in the usual manner and which may be readily cleaned. It is a further object of the invention to provide an improved guideway structure which is particularly adapted to be used with the carrier chain of the invention, the combination of the guideway and the chain being operable to guide the carrier chain around corners without danger of tilting the carrier plates and without the need for auxiliary sprockets.

Other objects and advantages of the invention will become known upon reference to the following description and the accompanying drawings of one preferred embodiment thereof.

In the drawings:

Fig. 1 is a fragmentary plan view of a conveyor embodying various features of the invention;

Fig. 2 is an enlarged, fragmentary view of a pair of carrier plates and interconnecting links which constitute a part of the conveyor illustrated in Fig. 1;

Fig. 3 is a side elevational view of the plates and links shown in Fig. 2;

Fig. 4 is a sectional view taken on line 4—4 in Fig. 1; and

Fig. 5 is a sectional view taken on line 5—5 in Fig. 1.

A conveyor embodying various features of the invention is illustrated in Fig. 1. The conveyor includes a plurality of interconnected carrier plates 7 which are slidably supported upon a track or guideway 9. Each of the carrier plates 7 presents a plane upper or load-carrying surface 11, and may be fabricated from a plane sheet of metal or the like, however, the load-carrying surface may be corrugated or otherwise formed. The ends of each of the carrier plates 7 are fabricated to register with the ends of the adjacent plates thereby providing a substantially continuous belt or ribbon on which the articles to be conveyed are placed. In the illustrated structure, the forward end of each of the carrier plates 7 is of convex shape and the rearward end of each of the plates 7 is of a concave shape, the sides 13 of the plate being defined by parallel straight lines. The convex forward end of each of the plates 7 includes a central arcuate portion 15 which is extended to the sides 13 of the plate by rearwardly and outwardly tapering, straight-line edges 17. The concave rearward end also includes an arcuate central portion 19 and tapering edges 21 which extend rearwardly and outwardly from the central arcuate portion 19 to intersect the sides 13 of the plate. The rearward tapering edges 17 of the convex forward end of the plate 7 and the rearwardly tapering edges 21 of the concave rearward end diverge so that a wedge-shaped opening 23 is formed between adjacent plates. The opening 23 should be sufficiently large to permit the longitudinally extending axes of adjacent plates to be angularly disposed relative to one another as occurs when the conveyor passes around a corner. It has been found that a wedge-shaped opening having an apex angle of about 25° ($\alpha$ in Fig. 2) is adequate for most installations.

A plurality of the carrier plates 7 are interconnected in end to end abutting relation to form the carrier surface of the conveyor by a plurality of chain links 25. The chain links 25 are of the flat-link type so that in an assembled chain alternate links are disposed at right angles to the adjacent links.

As illustrated in Fig. 3, one of the links 25 is rigidly attached to the lower surface of each of the carrier plates 7 with the link 25 disposed in a plane which is normal to the surface of the carrier plate 7. Desirably, the link 25 is attached to the plate 7 with a fillet weld 27 so that after grinding, the weld 27 presents a smooth curved surface which is readily cleaned.

Each of the links 25 which is welded to one of the plates 7 is attached to the link 25 welded to the next adjacent plate by three links $25_1$, $25_2$, and $25_3$, two of the links $25_1$ and $25_2$, being horizontally disposed (parallel to the plate) and the other of the links, $25_3$, being vertically disposed. The central opening in each of the links is longer than is necessary to receive the adjacent links thereby permitting the links to be moved longitudinally relative to one another to provide access to the inner surfaces of each of the links for cleaning. A substantial amount of cleaning may be eliminated if the rod from which the links are fabricated is of a cross section which corresponds to the radius of curvature around the end of each link, the surfaces of interconnecting links then fitting closely together. When the links 25 are proportioned in this manner, and the surface of the link is ground smooth prior to interconnecting the chain, the rubbing contact between the links during operation serves to clean out any material which may become lodged in the chain and thus results in an inherently sanitary structure which may be readily cleaned as desired.

The supporting guideway 9 for the assembled carrier or conveyor includes a plurality of supporting units 29 (Figs. 4 and 5) each of which includes a pedestal 31 whose lower end is adapted to be attached to a stationary supporting member (not shown) and whose upper end supports a box-like frame 33. The box-like frame 33 includes a pair of spaced-apart, vertically extending side members 35 and a pair of horizontally disposed, vertically spaced-apart members 37 which define the upper and lower ends of the frame 33. The lower of the members 37 is attached to the pedestal 31 and this member supports a horizontally disposed plate 39 which forms a supporting surface for the lower or returning run of the endless conveyor. The plate 39 may extend along the entire length of the lower run of the conveyor or it may be interrupted so as to provide support only at the necessary points along the run. In order to maintain the conveyor centered on the plate 39, a guide block 41 is attached to each of the members 35, these guide blocks being adapted to slidably engage the sides 13 of the carrier plates 7.

The upper run of the conveyor is slidably supported on a pair of longitudinally extending, spaced apart tracks 43 which are attached to the upper of the members 37, the lower surface of the carrier plates 7 slidably engaging the upper edges of the tracks 43. The tracks 43 extend along the entire length of the upper run of the conveyor and are fabricated in an arcuate shape of the desired radius of curvature at points where the direction of the conveyor is to be changed. The spacing of the tracks 43 is such that the links 25 which interconnect the carrier plates 7 are disposed between the tracks 43, and movement of the plates 7 transversely of the direction of movement of the conveyor is prevented by the engagement of side surfaces of the horizontally extending links 25 with the tracks 43.

A pair of arms 45 are provided at the upper end of the frame 33, and each of the arms 45 carries a pair of longitudinally extending rails 47 which may be flexible or which may be rigid to provide a permanent guideway for the material being carried. The rails 47 are disposed one above the other and are so positioned by the arms 45 that they are in close engagement with the bottles or other articles being conveyed.

When the conveyor changes direction, the supporting units 29 for the upper and lower runs of the conveyor are modified in such a manner that side play of the conveyor at the turning point and the canting or tilting of the carrier plates 7 is prevented. A supporting unit 29' which is disposed at a bend in the conveyor is illustrated in Fig. 5. From reference to the drawing it can be seen that this supporting member also includes the box-like frame 33, the plate 39 for supporting the lower run of the carrier chain and the tracks 43 for supporting the upper run of the carrier chain. In addition to the supporting members which have been described a pair of additional guideways 49 and 51 are provided for both the lower and upper runs of the conveyor, respectively. The guideway 49 for the lower run of the conveyor provides a longitudinally extending guideway for the chain links 25 and includes a pair of tracks 53 which are supported upon a bracket 54 attached to the vertically extending member 35 of the frame 33. The tracks 53 are disposed along the inner radius of curvature of the conveyor in the region in which the direction is changed (Fig. 1). As is shown in Fig. 5, the tracks 53 present a vertically disposed face which engages the vertically extending surfaces of the vertically disposed links of the chain and an opening for receiving the projecting portion of the horizontally disposed links. In addition, the tracks 53 are spaced apart to closely limit vertical movement of the horizontally extending links, and this prevents up and down movement of the carrier plate 7.

Similar spaced apart tracks 55 are attached to the inner of the tracks 43 in the region in which the conveyor is changing direction. The tracks 55 are spaced apart a sufficient amount to closely limit vertical movement of the horizontally disposed links thus preventing up and down movement of the carrier plate 7. The tracks 55 are also proportioned to bear against the side surface of the vertically disposed links of the upper run of the conveyor. It has been found that this construction provides a highly effective guideway for a carrier chain in accordance with the invention and substantially prevents the tilting or canting of the carrier plates during operation.

The conveyor may be driven from a suitable source of power such as the motor 57 shown in Fig. 1. As illustrated, the driving shaft of the motor is operatively connected to a shaft 59 which supports a driving sprocket 61. The driving sprocket 61, of course, is proportioned to engage the chain links 25.

In the foregoing there has been described an improved conveyor which may be easily cleaned and which may be disposed around corners of substantially any radius. Further, in a conveyor of the type described, it is unnecessary to provide additional sprockets at each of the turns since the conveyor and its supporting frame cooperate to prevent canting and to turn the chain to the proper radius. The improved chain is readily cleanable and may be dismantled from its supporting frame with a minimum of effort. Various of the features of the invention are set forth in the appended claims.

I claim:

1. In combination in a conveyor, an endless chain which is fabricated from a plurality of interconnected, elongated, flat links, alternate links being disposed at substantially right angles to adjacent links, said chain being disposed so that alternate links are horizontally disposed and the other links are vertically disposed, said conveyor changing direction in a portion of its line of travel, a plurality of carrier plates and means for rigidly attaching said carrier plates in end to end abutting relation to spaced-apart, vertically disposed links to provide a carrier surface, means for supporting said carrier surface including a pair of horizontally spaced-apart, elongated tracks, said carrier plates being disposed upon and being in sliding contact with the upper surface of said tracks, and a second pair of tracks located between said horizontally spaced-apart tracks in the region in which said conveyor changes direction, said second pair of tracks being elongated and vertically spaced apart, providing a bearing surface for one side of said vertically extending links and providing a guideway for receiving portions of said horizontally disposed links.

2. In combination in a conveyor, an endless chain which is fabricated from a plurality of interconnected, elongated, flat links, alternate links being disposed at substantially right angles to adjacent links, said chain being disposed so that alternate links are horizontally disposed and the other links are vertically disposed, said conveyor changing direction in a portion of its line of travel, a plurality of carrier plates and means for rigidly attaching said carrier plates in end to end abutting relation to spaced-apart, vertically disposed links to provide a carrier surface, means for supporting said carrier surface including a pair of horizontally spaced-apart, elongated tracks, said carrier plates being disposed upon and being in sliding contact with the upper surface of said tracks, the height and spacing of said tracks being such that said tracks form a guideway for minimizing the movement of said links transversely of the line of movement of said conveyor, and a second pair of tracks located between said horizontally spaced-apart tracks in the region in which said conveyor changes direction, said second pair of tracks being elongated and vertically spaced apart, providing a bearing surface for one side of said vertically extending links and providing a second guideway for receiving projecting portions of said horizontally disposed links.

3. In combination in a conveyor, an endless chain which is fabricated from a plurality of interconnected, elongated, flat links, alternate links being disposed at right angles to adjacent links, said chain being disposed so that alternate links are horizontally disposed and the other links are vertically disposed, said conveyor changing direction in a portion of its line of travel, a plurality of carrier plates and means for rigidly attaching said carrier plates in end to end abutting relation to spaced-apart, vertically disposed links to provide a carrier surface, means for supporting said carrier surface including a pair of horizontally spaced-apart, elongated tracks, said carrier plates being disposed upon and being in sliding contact with the upper surface of said tracks, a second pair of tracks, said second pair of tracks being elongated and vertically spaced apart, means for attaching said second pair of tracks to the inwardly facing surface of one of sid first pair of tracks in the region in which said conveyor changes direction, and said second pair of tracks providing a bearing surface for one side of said vertically extending links and a guideway for receiving projecting portions of said horizontally disposed links.

4. In combination in a conveyor, an endless chain which is fabricated from a plurality of interconnected, elongated, flat links, alternate links being disposed at substantially right angles to adjacent links, said chain being disposed so that alternate links are horizontally disposed and the other links are vertically disposed, said conveyor changing direction in a portion of its line of travel, a plurality of carrier plates and means for rigidly attaching said carrier plates in end to end abutting relation to spaced-apart, vertically disposed links to provide a carrier surface, means for supporting said carrier surface including a pair of horizontally spaced-apart, elongated tracks, said carrier plates being disposed upon and being in sliding contact with the upper surface of said tracks, a second pair of tracks, said second pair of tracks being elongated and vertically spaced apart, means for attaching said second pair of tracks to the inwardly-facing side surface of one of said first pair of tracks in a region in which said conveyor changes direction, said second pair of tracks providing a bearing surface for one side of said vertically extending links and a guideway for receiving projecting portions of said horizontally disposed links, and the dimensions and the spacing of said second pair of tracks being such that said second guideway receives said outwardly projecting portions of said horizontally disposed links and minimizes the vertical movement of said horizontally disposed links relative to said tracks.

5. In combination in a conveyor, an endless chain which is fabricated from a plurality of interconnected, elongated, flat links, alternate links being disposed at right angles to adjacent links, said chain being disposed so that alternate links are horizontally disposed and the other links are vertically disposed, said conveyor changing direction in a portion of its line of travel, a plurality of carrier plates and means for rigidly attaching said carrier plates in end to end abutting relation to spaced-apart, vertically disposed links to provide a carrier surface, means for supporting said carrier surface including a pair of horizontally spaced-apart, elongated tracks, said carrier plates being disposed upon and being in sliding contact with the upper surface of said tracks, the vertical height and the spacing of said tracks being such that said tracks form a guideway for minimizing the movement of said links transversely of the line of movement of said conveyor, a second pair of tracks, said second pair of tracks being elongated and vertically spaced apart, means for attaching said second pair of tracks to the inwardly facing side surface of one of said first pair of tracks in the region in which said conveyor changes direction, and said second pair of tracks providing a bearing surface for one side of said vertically extending links and a second guideway for receiving projecting portions of said horizontally disposed links.

6. In combination in a conveyor, an endless chain which is fabricated from a plurality of interconnected, elongated, flat links, alternate links being disposed at substantially right angles to adjacent links, said chain being disposed so that alternate links are horizontally disposed and the other links are vertically disposed, said conveyor changing direction in a portion of its line of travel, a plurality of carrier plates and means for rigidly attaching said carrier plates in end to end abutting relation to spaced-apart, vertically disposed links to provide a carrier surface, means for supporting said carrier surface including a pair of horizontally spaced-apart, elongated tracks, said carrier plates being disposed upon and being in sliding contact with the upper surface of said tracks, the vertical height and the spacing of said tracks being such that said tracks form a guideway for minimizing the movement of said links transversely of the line of movement of said conveyor, a second pair of tracks, said second pair of tracks being elongated and vertically spaced apart, means for attaching said second pair of tracks to the inwardly facing side surface of one of said first pair of tracks in a region in which said conveyor changes direction, said second pair of tracks providing a bearing surface for one side of said vertically extending links and a second guideway for receiving projecting portions of said horizontally disposed links, and the dimensions of the spacing of said second pair of tracks being such that said second guideway receives said outwardly projecting portions of said horizontally disposed links and minimizes the vertical movement of said horizontally disposed links relative to said tracks.

References Cited in the file of this patent

UNITED STATES PATENTS

| Number | Name | Date |
|---|---|---|
| 881,908 | Demarest | Mar. 17, 1908 |
| 1,929,707 | Mojonnier | Oct. 10, 1933 |
| 2,157,283 | Dyson | May 9, 1939 |
| 2,443,947 | Brooks et al. | June 22, 1948 |
| 2,543,368 | Jones et al. | Feb. 27, 1951 |

FOREIGN PATENTS

| Number | Country | Date |
|---|---|---|
| 505,133 | Great Britain | May 5, 1939 |